United States Patent
Valori et al.

(10) Patent No.: US 11,935,691 B2
(45) Date of Patent: Mar. 19, 2024

(54) TRANSFORMER ASSEMBLY FOR ELECTRIC GRIDS AND A RELATED CONTROL METHOD

(71) Applicant: HITACHI ENERGY LTD, Zürich (CH)

(72) Inventors: Valentina Valori, Monselice (IT); Ruggero Bordon, Monselice (IT)

(73) Assignee: HITACHI ENERGY LTD, Zürich (CH)

( * ) Notice: Subject to any disclaimer, the term of this patent is extended or adjusted under 35 U.S.C. 154(b) by 214 days.

(21) Appl. No.: 17/638,443

(22) PCT Filed: Oct. 26, 2020

(86) PCT No.: PCT/EP2020/080056
§ 371 (c)(1),
(2) Date: Feb. 25, 2022

(87) PCT Pub. No.: WO2021/094080
PCT Pub. Date: May 20, 2021

(65) Prior Publication Data
US 2023/0025613 A1    Jan. 26, 2023

(30) Foreign Application Priority Data
Nov. 14, 2019    (EP) ..................... 19209193

(51) Int. Cl.
*H01F 29/02*    (2006.01)
*H01F 27/24*    (2006.01)
*H02J 3/00*    (2006.01)

(52) U.S. Cl.
CPC ........... *H01F 29/025* (2013.01); *H01F 27/24* (2013.01); *H02J 3/00* (2013.01)

(58) Field of Classification Search
CPC .......... H01F 27/24; H01F 29/025; H02J 3/00; H02J 3/16; H02J 3/1878; G05F 1/14; H02P 13/06; Y02E 40/30
(Continued)

(56) References Cited

U.S. PATENT DOCUMENTS 5,136,233  A    8/1992  Klinkenberg et al.
2013/0282312 A1* 10/2013 Abeywickrama ...... G01R 31/62
                                                    702/58
(Continued)

FOREIGN PATENT DOCUMENTS

CN    101919147 A    12/2010
CN    104242655 A    12/2014
(Continued)

OTHER PUBLICATIONS

Machine translation of Seo Korean Patent Document KR 10-2006-097527 A Sep. 2006 (Year: 2006).*
(Continued)

*Primary Examiner* — Kevin J Comber
(74) *Attorney, Agent, or Firm* — Sage Patent Group (57) ABSTRACT

A transformer assembly for electric grids including: an electric transformer including a magnetic core, a first side including one or more first windings enchained with said magnetic core and adapted to be electrically connected to a first grid section and a second side including one or more second windings enchained with said magnetic core and adapted to be electrically connected to a second grid section; a tap changer operatively associated with said electric transformer to vary the number of turns enchained with said magnetic core for said first windings; a control unit to: acquire input data indicative of an electrical connectivity condition of said second grid section with said second windings; determine whether said transformer is in a load (Continued)

condition or in a no-load condition; and, in a no-load condition, command said tap changer to set a maximum available number of turns for said first windings.

20 Claims, 3 Drawing Sheets

(58) Field of Classification Search
USPC .......................................................... 361/139
See application file for complete search history.

(56) References Cited

U.S. PATENT DOCUMENTS

2014/0362612 A1* 12/2014 Shi .................... H02M 3/33523
363/21.16
2015/0168965 A1* 6/2015 Baerthlein ................ G05F 1/14
323/340

FOREIGN PATENT DOCUMENTS

| EP | 0849655 | A2 | | 6/1998 | |
|---|---|---|---|---|---|
| EP | 2889998 | A2 | | 7/2015 | |
| GB | 236596 | A | | 6/1926 | |
| KR | 2006097527 | A | * | 9/2006 | ............... G05F 1/14 |
| KR | 20060097527 | A | | 9/2006 | |

OTHER PUBLICATIONS

International Search Report and Written Opinion of the International Searching Authority, PCT/EP2020/080056, dated Jan. 13, 2021, 20 pages.

Nnachi, G.U. et al., "Estimation of No-Load Losses in Distribution Transformer Design Finite Element Analysis Techniques in transformer design," 2018 IEEE PES/IAS PowerAfrica, 5 pages.

Cham, Edward J. et al., "Current Regulators for Large Rectifier Power Supplies Used on Electrochemical Processing Lines," IEEE Transactions on Industry and General Applications, vol. IGA-4, 1968, No. 6, 10 pages.

Extended European Search Report dated May 8, 2020 for European Patent Application No. 19209193.2, 12 pages.

First Office Action for Japanese Patent Application No. 202080061889.8, dated Jun. 15, 2023, 5 pages.

Second Office Action for Chinese Application No. 202080061889.8, dated Nov. 16, 2023, 6 pages.

* cited by examiner

TRANSFORMER ASSEMBLY FOR ELECTRIC GRIDS AND A RELATED CONTROL METHOD

CROSS REFERENCE TO RELATED APPLICATIONS

This application is a 35 U.S.C. § 371 national stage application of PCT International Application No. PCT/EP2020/080056 filed on Oct. 26, 2020, which in turn claims foreign priority to European Patent Application No. 19209193.2, filed on Nov. 14, 2019, the disclosures and content of which are incorporated by reference herein in their entirety.

FIELD

The present disclosure relates to a transformer assembly for electric grids, e.g. electric power transmission and distribution grids.

In a further aspect the present disclosure relates to a method for controlling a tap changer included in said transformer assembly.

BACKGROUND

Electric transformers are widely used in electric grids to transmit electric power between grid sections operating at different nominal voltages.

As it is known, transformers are subject to power losses in operation.

Power losses generally include the so-called "load power losses", arising only when the voltage transformer operates in a so-called "load condition" (i.e. it is electrically connected with a corresponding grid section at the primary side and with a corresponding grid section at the secondary side), and the so-called "no-load power losses", which are always present when a voltage transformer operates.

No-load power losses can be observed when a transformer is in a so-called "no-load condition", i.e. it is electrically connected with a corresponding grid section at the primary side and it is electrically disconnected from a corresponding grid section at the secondary side. In this situation, due to the induced magnetic flux generated by the primary windings, a current (the so called "no-load current") circulates along the magnetic core even if the secondary windings of the transformer are disconnected from any electric load. Said no-load current generates power losses in the magnetic core and along the primary windings, which are strongly dependent on the magnetic flux.

No-load power losses represent a relevant issue, particularly when the transformer is frequently subject to a no-load condition, as it occurs when it is installed in renewable energy production facilities or in electric grids provided with redundancy systems.

As an example, energy dissipation costs due to no-load power losses in a medium-size power transformer intended for use in a renewable energy production facility are normally estimated in the order of thousands EUR/kW per year.

A simple solution to reduce no-load power losses would be designing the magnetic core of the transformer in such a way to generate a lower magnetic flux. However, such an approach would unacceptably limit the performances of the transformer where this latter is in a load condition, in practice when exploiting its major function of transferring electric power between different grid sections.

SUMMARY

An aim of the present disclosure is providing a transformer assembly for electric grids, which allows solving or mitigating the technical issues evidenced above.

Within this aim, an object of the present disclosure is providing a transformer assembly, in which it is possible to reduce no-load power losses effectively, when the electric transformer operates in a no-load condition.

A further object of the present disclosure is providing transformer assembly that can be industrially realized at competitive costs.

These aim and objects are achieved by a transformer assembly for electric grids, including according to the following embodiments.

According to some embodiments, a transformer assembly comprises:

an electric transformer comprising a magnetic core, a first side including one or more first windings enchained with said magnetic core and adapted to be electrically connected to a first grid section and a second side including one or more second windings enchained with said magnetic core and adapted to be electrically connected to a second grid section;

a tap changer operatively associated with said electric transformer to vary the number of turns enchained with said magnetic core for said first windings or for said second windings;

a control unit operatively coupled with said tap changer to control the operation of said tap changer.

The control unit is configured to:

acquire input data indicative of an electrical connectivity condition of said second grid section with said second windings;

basing on said input data, determine whether said transformer is in a load condition or in a no-load condition;

if said transformer is in a no-load condition, command said tap changer to set a maximum available number of turns for said first windings or for said second windings.

Said control unit may be configured to control said tap changer in such a way to carry out a regulation of a second voltage provided at said second windings, if said transformer is in a load condition.

The transformer assembly, according to the disclosure, may comprise:

current sensing means adapted to provide first sensing signals indicative of a second current circulating along said second windings;

voltage sensing means adapted to provide second sensing signals indicative of a second voltage provided at said second windings.

Conveniently, said control unit is operatively coupled with said voltage sensing means.

Said control unit may be configured to acquire said input data by processing the first sensing signals provided by said current sensing means.

The transformer assembly, according to the disclosure, may comprise signaling means adapted to receive the first sensing signals provided by said current sensing means and provide third sensing signals indicative of the level of the current circulating along said second windings.

Said control unit may be configured to acquire said input data by processing said third sensing signals.

Said signaling means may include an electronic relay.

Said transformer assembly may comprise a suitable Station Service Voltage Transformer (SSVT) for providing an auxiliary power supply, e.g. for feeding said control unit. Said SSVT can be a capacitive voltage transformer (typically oil-filled insulated) or an inductive voltage transformer (typically gas insulated).

In a further aspect, the present disclosure relates to an electric grid, according to the following claim 8.

In a further aspect, the present disclosure relates to a method for controlling a tap changer included in a transformer assembly as illustrated above, according to the following claim 9 and the related dependent claims.

The method, according to the disclosure, comprises the following operations:
- acquiring input data indicative of an electrical connectivity condition of said second grid section with said second windings;
- basing on said input data, determining whether said transformer is in a load condition or in a no-load condition;
- if said transformer is in a no-load condition, commanding said tap changer to set a maximum available number of turns for said first windings or for said second windings.

The method, according to the disclosure, may comprise the following operation:
- controlling said tap changer in such a way to carry out a regulation of a second voltage provided at said second windings, if said transformer is in a load condition.

Acquiring said input data may include processing the first sensing signals provided by said current sensing means.

Acquiring said input data may include processing the third sensing signals provided by said signaling means.

Further characteristics and advantages of the present disclosure will be more apparent with reference to the description given below and to the accompanying figures, provided purely for explanatory and non-limiting purposes, wherein.

DETAILED DESCRIPTION

Figure 1:
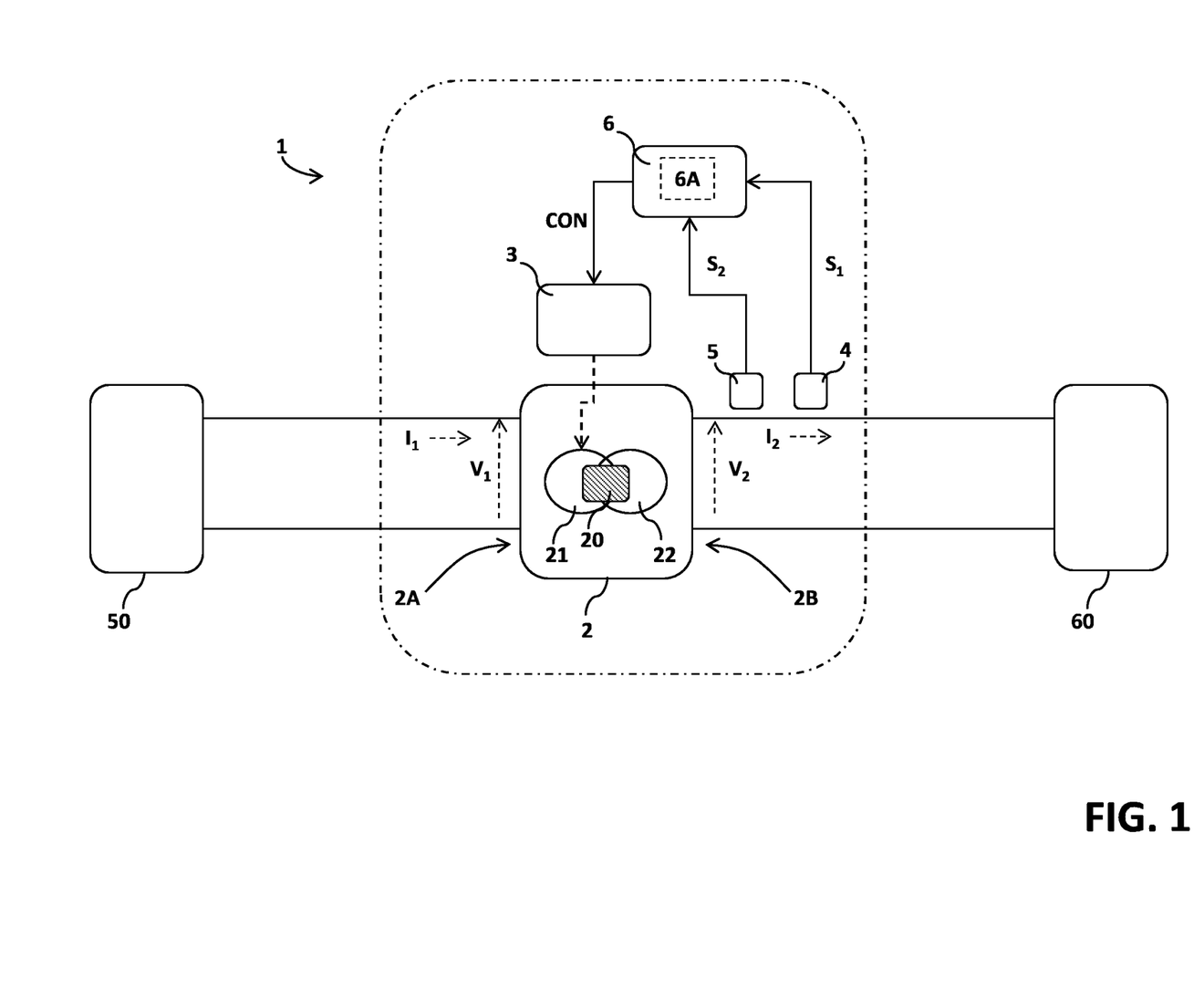
FIG. 1 schematically illustrates a transformer assembly, according to an embodiment of the present disclosure.
Figure 2:
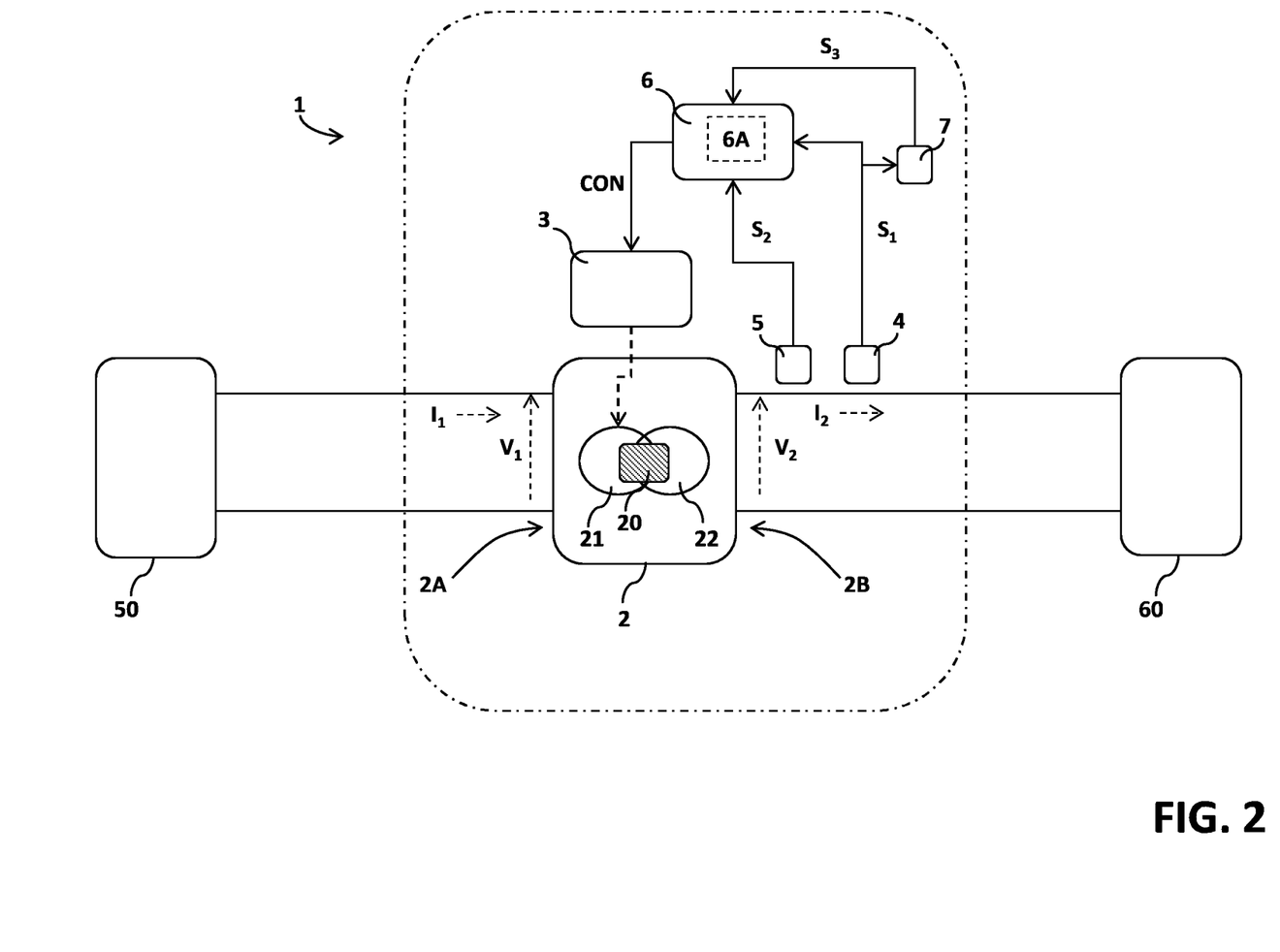
FIG. 2 schematically illustrates a transformer assembly, according to another embodiment of the present disclosure.
Figure 3:
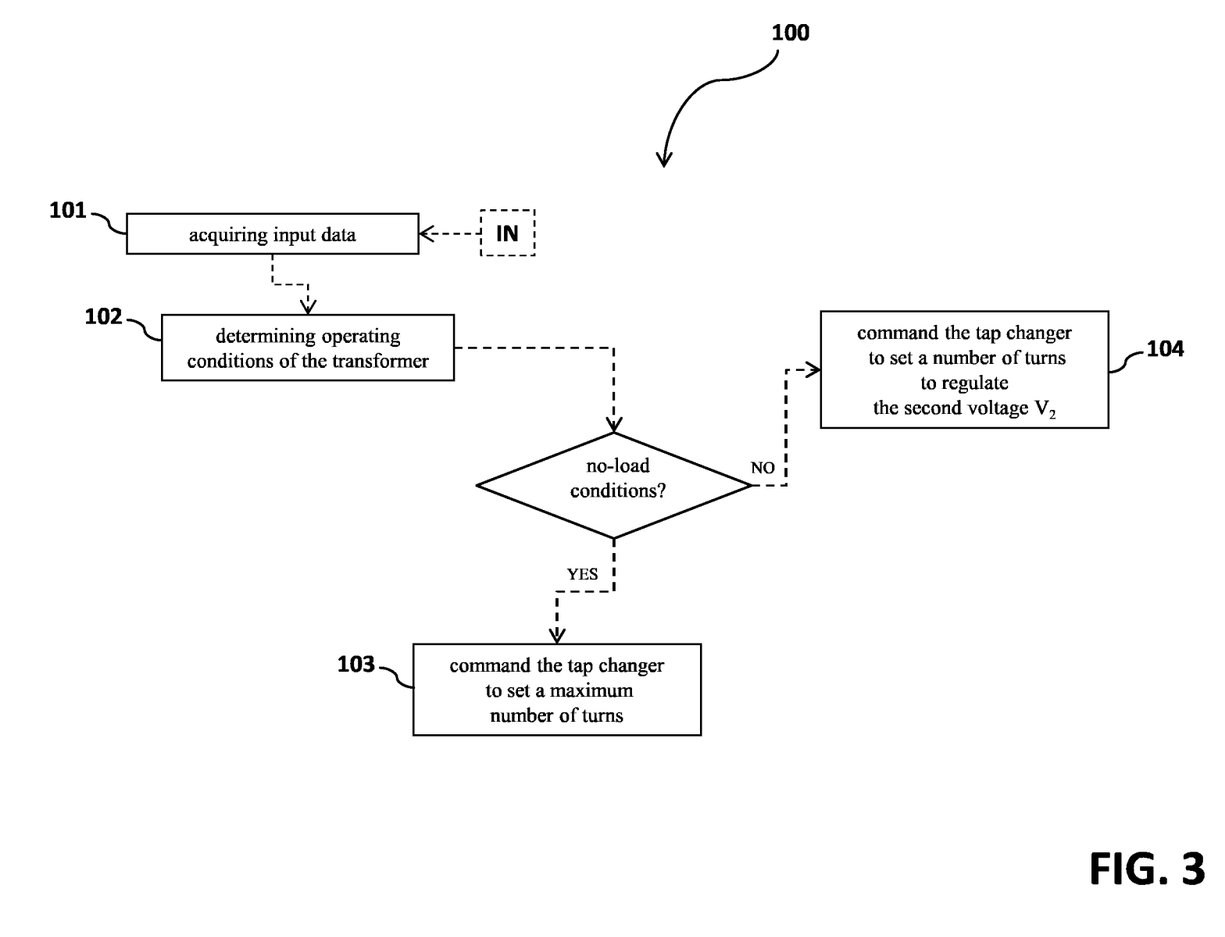
FIG. 3 schematically illustrates a method for controlling a tap changer included in the transformer assembly, according to the present disclosure.

With reference to the aforesaid figures, the transformer assembly 1, according to the disclosure, will now be described in details.

The transformer assembly 1 is particularly adapted for use in electric grids, more particularly in electric power transmission and distribution grids.

The transformer assembly 1 comprises an electric transformer 2 basically operating as a voltage transformer configured to transmit electric power between different grid sections operating at different nominal voltages.

The transformer 2 comprises a magnetic core 20, a first side 2A including one or more first windings 21 enchained with the magnetic core 20 and adapted to be electrically connected to a first grid section 50 and a second side 2B including one or more second windings 22 enchained with the magnetic core 20 and adapted to be electrically connected to a second grid section 60.

In operation, the transformer 2 shows a first voltage $V_1$ and a first current $I_1$ at the first windings 21 and a second voltage $V_2$ and a second current $I_2$ at the second windings 22.

The first side 2A and the first windings 21 may respectively form the primary side and the primary windings of the electric transformer 2 while the second side 2B and the second windings 22 respectively form the secondary side and the secondary windings of the transformer 2.

The transformer 2 may be adapted to transfer electric power from the first grid section 50 operating at a higher nominal voltage (e.g. 100 kV) to the second grid section 60 operating at a lower nominal voltage (e.g. 30 kV).

Therefore, the transformer 2 may receive a first voltage $V_1$ at the first windings 21, which is higher than a second voltage $V_2$ provided at the second windings 22. The first windings 21 may thus have a higher number of turns than the second windings 22.

A second current $I_2$ circulates along the secondary windings 22 when the transformer 2 is in a load condition. When the transformer 2 operates in a no-load condition (no electric loads are present), such a second current $I_2$ is null.

For the sake of clarity, it is specified that:
- the transformer 2 is in a "load condition" when there is an equivalent electric load electrically with the second windings 22, i.e. the second grid section 60 is electrically connected with the second windings 22;
- the transformer 2 is in a "no-load condition" when there are no electric loads electrically connected with the second windings 22, i.e. the second grid section 60 is electrically disconnected from the second windings 22.

The grid sections 50, 60 may include a single electric phase (as shown in the cited figures for simplicity) or, more frequently, multiple electric phases (typically three electric phases).

The transformer 2 (and thus the voltages $V_1$, $V_2$ and the currents $I_1$, $I_2$) may thus be of single-phase type (as shown in the cited figures) or multiple-phase type (typically of three-phase type).

In principle, the transformer 2 may be of any type adapted for use in electric grids. As an example, the transformer 2 may be a power transformer, a distribution transformer or an isolation transformer, according to the needs.

The electric transformer 2 may be industrially manufactured according to solutions of known type. Therefore, hereinafter, it will be described only in relation to the aspects relevant to the disclosure, for the sake of brevity.

The transformer assembly 1 further comprises a tap changer 3 operatively associated with the electric transformer 2 at the first windings 21 or at the second windings 22.

In general, the tap changer 3 is adapted to vary the number of turns enchained with the magnetic core 20 for the first windings 21 or the second windings 22. In this way, it acts on the turn ratio of the transformer 2 in order to maintain (when first voltage V1 is varying at the first winding 21) a desired second voltage $V_2$ at the second windings 22 (CFVV—Constant Flux Voltage Variation) or it acts in order to vary the magnetic flux circulating along the magnetic core, so consequently varying the second voltage V2 at the second windings 22 (VFVV—Variable Flux Voltage Variation).

According to some embodiments of the disclosure, the tap changer 3 is arranged in such a way to vary the number of turns of the first windings 21, which are enchained with the magnetic core 20. In the following description, a particular reference will be made to this solution (see FIGS. 1-2), for the sake of simplicity.

According to other embodiments of the disclosure, however, the tap changer 3 may be arranged in such a way to vary the number of turns of the second windings 22, which are enchained with the magnetic core 20.

According to some embodiments of the disclosure, the tap-changer 3 is configured to operate as an on-load tap changer (OLTC). In this way, it may not be necessary to electrically disconnect the transformer 2 from both first and second grid sections to operate the tap changer 3.

The tap-changer 3 may comprise a plurality of connection points (taps) with the first windings 21 (or the second windings 22) of the transformer 2. Each tap conveniently allows a certain number of additional turns to be selected for the first windings 21 (or the second windings 22).

In principle, the tap changer 3 may be of any type adapted for use in electric power grids.

As an example, the tap-changer 3 may be of mechanical type. In this case, it will comprise a tap selector mechanism capable of moving one or more movable contacts couplable with corresponding taps to electrically connect in a selective manner said taps with the transformer windings. The tap selector mechanism is conveniently moved by a kinematic chain that is in turn actuated by a actuation unit (e.g. a motorized unit). Said actuation unit is conveniently controllable through suitable control signals.

As a further example, the tap-changer 3 may be of electronic type. In this case, it will comprise suitable power electronics circuits including power electronic switches (such as transistor or thyristor) capable of electrically connecting in selective manner said taps with the transformer windings. Said power electronic circuits may be conveniently driven by suitable control signals.

As a further example, the tap-changer 3 may be of hybrid type. In this case, it will comprise both mechanical and electronic arrangements to electrically connect in a selective manner above-mentioned taps with the transformer windings.

In general, the tap changer 3 may be industrially manufactured according to solutions of known type. Therefore, hereinafter, it will be described only in relation to the aspects relevant to the disclosure, for the sake of brevity.

The transformer assembly 1 comprises a control unit 6 operatively coupled with the tap changer 3 to control the operation of this latter.

If the tap changer 3 is of mechanical type, the control unit 6 can control the operation of the tap changer 3 by sending suitable control signals CON to the actuation unit actuating the mechanic arrangements of the tap changer.

If the tap changer 3 is of electronic type, the control unit 6 can control the operation of the tap changer 3 by sending suitable control signals CON to power electronic circuits (in particular to the power switches) of the tap changer.

If the tap changer 3 is of hybrid type, the control unit 6 can control the operation of the tap changer 3 by sending suitable control signals CON to the actuation unit and to the power electronic circuits of the tap changer.

The control unit 6 is conveniently provided with data processing resources 6A, such as of digital type, e.g. including one or more microprocessors capable of executing software instructions stored or storable in a storage medium (e.g. a memory of said control unit).

The control unit 6 can thus carry out its functionalities (for example the functionalities described in the following) by executing suitable sets of software instructions stored in a memory.

The control unit 6 may be arranged on board the tap changer 3. In this case, the transformer assembly 1 may include suitable power supply arrangements (not shown) to feed the control unit 6.

According to other embodiments of the disclosure, however, the control unit 6 may be arranged in a remote location with respect to the tap changer 3. For example, it may be part of a remote suitable control panel or control platform.

According to some embodiments of the disclosure, the transformer assembly 1 comprises current sensing means 4 adapted to provide first sensing signals $S_1$ indicative of the second current $I_2$ circulating along the second windings 22 of the transformer and voltage sensing means 5 adapted to provide second sensing signals $S_2$ indicative of the second voltage $V_2$ at the second windings 22 of the transformer.

The current sensing means 4 may comprise a current sensor (e.g. a current transformer or a resistive shunt circuit) for each electric phase of the second windings 22 of the transformer.

The current sensing means 4 may be operatively coupled with the control unit 6, so that this latter can receive and process the first sensing signals $S_1$.

The voltage sensing means 5 may comprise a voltage sensor (e.g. a capacitive sensor or a resistive shunt circuit) for each electric phase of the second windings 22 of the transformer.

The voltage sensing means 5 may be operatively coupled with the control unit 6, so that this latter can receive and process the second sensing signals $S_2$.

An important aspect of the disclosure resides in that the control unit 6 is capable of carrying out control functionalities of the tap changer 3, which allow remarkably reducing no-load power losses, when the transformer 2 is a no-load condition.

A further important aspect of the disclosure resides in that the control unit is capable of carrying out different control functionalities (or control logics) of the tap changer 3, depending on whether the transformer 2 in a load-condition or in a no-load condition.

As it will be better emerging from the following, this solution allows remarkably improving the performances of the transformer 2, both when this latter is in a load condition and in a no-load condition.

According to the disclosure, the control unit 6 is configured to acquire input data IN indicative of an electrical connectivity condition of the second grid section 60 with the second windings 22 of the transformer.

Input data IN are indicative of whether the second grid section 60 is electrically connected or not with the second windings 22 of the transformer.

According to possible embodiments of the disclosure, the control unit 6 is configured to acquire the input data IN by directly processing the first sensing signals $S_1$ provided by the current sensing means 4. To this aim, the data processing means 6A of the control unit 6 may conveniently carry out simple detection algorithms of known type.

According to some embodiments of the disclosure (FIG. 2), the transformer assembly 1 comprises signaling means 7 adapted to receive the first sensing signals $S_1$ provided by the current sensing means 4 and provide third sensing signals $S_3$ indicative of the level of the second current $I_2$ circulating along the second windings 22. Conveniently, the third sensing signals $S_3$ may be logic signals indicative of whether the second current $I_2$ circulating along the second windings 22 is null or not.

The signalling means 7 may comprise an electronic relay, such as a minimum current relay.

According to these embodiments of the disclosure, the control unit 6 is operatively coupled with the signaling means 7 to receive the third sensing signals $S_3$.

Conveniently, the control unit 6 is adapted to acquire the input data IN by suitably processing the third sensing signals $S_3$ (FIG. 3) and, possibly, the first sensing signals $S_1$ described above.

The control unit 6 thus determines whether the transformer 2 is in a load condition or in an unload condition by determining whether the second grid section 60 is electrically connected or disconnected with the second windings 22 of the transformer 2.

According to the disclosure, the control unit 6 determines whether the transformer 2 is in a load condition or in a no-load condition basing on the acquired input data IN.

In order to carry out the above-mentioned determination operation, the control unit 6 suitably processes the acquired input data IN. To this aim, the data processing means 6A of the control unit 6 may conveniently carry out simple determination algorithms of known type.

If the transformer 2 is in a no-load condition (second grid section 60 electrically disconnected from the second windings 22), the control unit 6 commands the tap changer 3 to set the maximum available number of turns for the first windings 21 (or for the second windings 22).

Thus, when the transformer 2 is in a no-load condition, the control unit 6 controls the tap changer 3 according to a first control logic, which is basically aimed at reducing power losses without considering the behavior of the second voltage $V_2$ provided by the transformer 2 at the second windings 22.

The above-mentioned first control logic is based on the observation that, in the transformer 2, the magnetic flux depends on the volt per turn ratio (V/N), according to the following relation:

$$\frac{V}{N} = \frac{V_1}{N_1} = \frac{V_2}{N_2} = 4.44 * f * Afe * B$$

where f is the grid frequency, Afe is a constant, B is the magnetic flux, $V_1$ is the first voltage at the first windings 21, $V_2$ is the second voltage at the second windings 22, $N_1$ is the number of turns of the first windings 21 and $N_2$ is the number of turns of the second windings 22 and V/N is the voltage ratio of the transformer.

It is evident from the above relation that setting the maximum available number of turns for the first windings 21 (or for the second windings 22) implies a reduction of magnetic flux B.

On the other hand, such a reduction of the magnetic flux B entails a remarkable reduction of the power losses, as these latter strongly depend on the magnetic flux.

Therefore, when the control unit 6 commands the tap changer 3 to set a maximum available number of turns for the first windings 21 (or for the second windings 22) with the transformer 2 in a no-load condition, a remarkable reduction of power losses is obtained.

According to some embodiments of the disclosure, if the transformer 2 is in a load condition (second grid section 60 electrically connected with the second windings 22), the control unit 6 controls the tap changer 6 in such a way to carry out a voltage regulation of the second voltage $V_2$ at the second windings 22.

Thus, when the transformer 2 is in a load condition, the control unit 6 controls the tap changer 3 according to a second control logic, which is completely different from the first control logic illustrated above.

Such a second control logic is basically aimed at regulating the second voltage $V_2$ provided by the transformer 2 at the second windings 22, so that an optimal power transfer between the first grid section 50 and the second grid section 60 is constantly ensured.

The control unit 6 may command the tap changer 3 to set a number of turns for the first windings 21 (or for the second windings 22) with the transformer 2, which depends on the detected second voltage $V_2$ at the second windings 22, when the transformer 2 is in a load condition.

The control unit 6 may process the second sensing signals $S_2$ received from the second sensing means 5 and, basing on the voltage detection data so obtained, commands the tap changer 3 to vary (if necessary) the number of turns enchained with the magnetic core 20 for said first windings 21 (or for the second wings 22).

Voltage regulation can be carried out in a known manner, for example in according to a method compliant to international regulations (e.g. IEC60076.1).

Conveniently, voltage regulation may involve a range of ±20% of the nominal value of the second voltage $V_2$ at the second windings 22 and it can be performed in a plurality of operations (e.g. from 9 to 35 operations) depending on the type of the changer 3.

Conveniently, voltage regulation may be carried out 10 to 20 times a day in normal applications, depending on fluctuations of the second voltage $V_2$, which may due to changes in the operating conditions of the grid sections 50 and 60.

The transformer assembly, according to the disclosure, may be subject to variants falling within the scope of the disclosure.

As mentioned above, the tap changer 3 may be arranged in such a way to vary the number of turns of the second windings 22, which are enchained with the magnetic core 20. It is evidenced that, also in this case, the control unit 6 implements the same control logics illustrated above to control the operation of the tap changer 3, when the transformer 2 is in a no-load condition or in a load condition.

In the embodiments in which the control unit 6 is arranged on board or in proximity of the tap-changer 3, electronic circuitry capable of deriving an auxiliary power supply from the first windings 21 or the second windings 22 of the transformer 2 may be suitably arranged (e.g. according to solutions of known type).

In these embodiments of the disclosure, a reduction of the auxiliary power supply of the control unit 6 may occur when the tap changer 3 sets a maximum available number of turns for the first windings 21 (or for the second windings 22) as illustrated above.

It has been seen that such an inconvenient may be suitably overcome by arranging a suitable Station Service Voltage Transformer (SSVT) for providing an auxiliary power supply, e.g. to feed the control unit 6. Said SSVT (not shown) can be a capacitive voltage transformer (typically oil-filled insulated) or an inductive voltage transformer (typically gas insulated).

In a further aspect, the present disclosure relates to a method 100 for controlling the tap changer 3 included in the transformer assembly 1 described above (FIG. 3).

The method 100 is suitable for being implemented in practice by the data processing means 6A of the control unit 6, which can conveniently carry out a suitable set of software instructions to this purpose.

The method 100, according to the disclosure, comprises an operation 101 of acquiring input data IN indicative of a condition of electrical connection of the second grid section 60 with the second windings 22.

According to some embodiments of the disclosure (FIG. 1), the operation 101 of acquiring the input data IN includes processing the first sensing signals 51 provided by the current sensing means 4.

According to some embodiments of the disclosure (FIG. 2), the operation 101 of acquiring the input data IN includes processing the third sensing signals $S_3$ provided by the signaling means 7.

The method 100, according to the disclosure, comprises an operation 102 of determining whether the second grid section 60 is electrically connected with or disconnected from the second windings 22, basing on the acquired input data IN.

The method 100, according to the disclosure, comprises an operation 103 of commanding the tap changer 3 to set a maximum number of turns for the first windings 21 (or for the second windings 22), if the second grid section 60 is electrically disconnected from the second windings 22.

The method 100, according to the disclosure, may comprise an operation 104 of controlling the tap changer 3 in such a way to carry out a regulation of the second voltage $V_2$ provided at the second windings 22, if the second grid section 60 is electrically connected with the second windings 22.

In operation 104 of the method 100, the tap changer 3 is commanded to set a number of turns for the first windings 21 (or for the second windings 22) with the transformer 2, which depends on the detected second voltage $V_2$ at the second windings 22.

The transformer assembly, according to the disclosure, provides relevant advantages with respect to corresponding systems of the state of the art.

The above-illustrated improved control functionalities of the tap changer 3 allow obtaining a strong reduction of power losses of the transformer 2, when this latter is in a no-load condition.

Experimental tests have shown that power losses can be reduced up to 48% (with respect to traditional solutions of the state of the art) when the transformer 2 operates in a no-load condition (with a magnetic flux excursion down to −20% of the nominal value), depending on the type of the transformer and type of network's fluctuation range.

Reduction of power losses can reach about 65% (with respect to traditional solutions of the state of the art) when the transformer 2 operates in a no-load condition (with a magnetic flux excursion down to −40% of the nominal value), again depending on the type of the transformer and type of network's fluctuation range.

Obviously, the above-mentioned features allow simplifying the management of the operating life of the transformer 2 with a remarkable reduction of overall industrial costs.

As an example, energy cost savings have been estimated in the order of several thousands EUR per year for a medium-size power transformer intended for use in a renewable energy production facility.

The solution provided by the disclosure further allows simplifying the design of the transformer 2 without having strong constraints for its behavior in no-load conditions. In this situation, in fact, power losses are reduced by properly controlling the tap changer 3 according to the first control logic illustrated above.

The magnetic core 20 of the transformer 2 can thus be designed in such a way to optimize the circulating magnetic flux in such a way that an optimal electric power transfer between different sides of the transformer 2 is obtained, when this latter is in a load condition.

The transformer assembly 1 has a simple and compact structure and it may be easily arranged, even for retrofitting purposes.

The transformer assembly 1 can be easily manufactured at industrial level with production costs quite competitive with respect to traditional devices of the same type.

The invention claimed is:

1. A transformer assembly for electric grids comprising:
    an electric transformer comprising a magnetic core, a first side including one or more first windings enchained with said magnetic core and adapted to be electrically connected to a first grid section and a second side including one or more second windings enchained with said magnetic core and adapted to be electrically connected to a second grid section, the first side and the one or more first windings forming a primary side and primary windings of the electric transformer, and the second side and the one or more second windings forming a secondary side and secondary windings of the transformer;
    a tap changer operatively associated with said electric transformer to vary the number of turns enchained with said magnetic core for said one or more first windings; and
    a control unit operatively coupled with said tap changer to control the operation of said tap changer;
    said control unit configured to:
        acquire input data indicative of an electrical connectivity condition of said second grid section with said second windings;
        basing on said input data, determine whether said transformer is in a load condition or in a no-load condition; and
        if said transformer is in a no-load condition, command said tap changer to set a maximum available number of turns for said one or more first windings.

2. Transformer assembly, according to claim 1, wherein said control unit is configured to control said tap changer in such a way to carry out a regulation of a second voltage provided at said second windings, if said transformer is in a load condition.

3. Transformer assembly, according to claim 1, further comprising:
    current sensing means adapted to provide first sensing signals indicative of a second current circulating along said second windings; and
    voltage sensing means adapted to provide second sensing signals indicative of a second voltage provided at said second windings,
    wherein said control unit is operatively coupled with said voltage sensing means.

4. Transformer assembly, according to claim 3, wherein said control unit is configured to acquire said input data by processing the first sensing signals provided by said current sensing means.

5. Transformer assembly, according to claim 3, further comprising signaling means adapted to receive the first sensing signals provided by said current sensing means and provide third sensing signals indicative of the level of the current circulating along said second windings, said control unit being configured to acquire said input data by processing said third sensing signals.

6. Transformer assembly, according to claim 5, wherein said signaling means include an electronic relay.

7. Transformer assembly, according to claim 1, further comprising a Station Service Voltage Transformer for providing an auxiliary power supply.

8. An electric power grid further comprising a transformer assembly, according to claim 1.

9. A method for controlling a tap changer included in a transformer assembly for electric grids, said transformer assembly comprising:
- an electric transformer comprising a magnetic core, a first side including one or more first windings enchained with said magnetic core and adapted to be electrically connected to a first grid section and a second side including one or more second windings enchained with said magnetic core and adapted to be electrically connected to a second grid section, the first side and the one or more first windings forming a primary side and primary windings of the electric transformer, and the second side and the one or more second windings forming a secondary side and secondary windings of the transformer; and
- a tap changer operatively associated with said electric transformer to vary the number of turns enchained with said magnetic core for said one or more first windings, the method comprising:
- acquiring input data indicative of an electrical connectivity condition of said second grid section with said second windings;
- basing on said input data, determining whether said transformer is in a load condition or in a no-load condition; and
- if said transformer is in a no-load condition, commanding said tap changer to set a maximum available number of turns for said one or more first windings.

10. Method, according to claim 9, further comprising the following step:
- controlling said tap changer in such a way to carry out a regulation of a second voltage provided at said second windings, if said transformer is in a load condition.

11. Method, according to claim 9, wherein said transformer assembly comprises:
- a current sensor adapted to provide first sensing signals indicative of a second current circulating along said second windings; and
- a voltage sensor adapted to provide second sensing signals indicative of a second voltage provided at said second windings.

12. Method, according to claim 11, wherein said step of acquiring said input data includes processing the first sensing signals provided by said current sensor.

13. Method, according to claim 11, wherein said transformer assembly comprises a signaling device adapted to receive the first sensing signals provided by said current sensor and adapted to provide third sensing signals indicative of the level of the current circulating along said second windings, said step of acquiring said input data includes processing the third sensing signals provided by said signaling device.

14. Method, according to claim 13, wherein said signaling device include an electronic relay.

15. Method, according to claim 9, wherein said transformer assembly comprises a Station Service Voltage Transformer for providing an auxiliary power supply.

16. A control unit for an electric transformer, the control unit configured to:
- operatively couple with a tap changer associated with the electric transformer to control the operation of said tap changer to vary a number of turns enchained with a magnetic core for one or more primary windings of a primary side of the electric transformer;

said control unit configured to:
- acquire input data indicative of an electrical connectivity condition of a grid section with one or more secondary windings of a secondary side of the electric transformer;
- basing on said input data, determine whether said transformer is in a load condition or in a no-load condition; and
- if said transformer is in a no-load condition, command said tap changer to set a maximum available number of turns for said one or more primary windings.

17. Control unit, according to claim 16, wherein said control unit is configured to control said tap changer in such a way to carry out a regulation of a second voltage provided at said one or more secondary windings, if said transformer is in a load condition.

18. Control unit, according to claim 16, further comprising:
- a current sensor configured to provide first sensing signals indicative of a second current circulating along said one or more secondary windings; and
- a voltage sensor configured to provide second sensing signals indicative of a second voltage provided at said one or more secondary windings,
- wherein said control unit is operatively coupled with said voltage sensor.

19. Control unit, according to claim 18, wherein said control unit is configured to acquire said input data by processing the first sensing signals provided by said current sensor.

20. Control unit, according to claim 18, further comprising a relay configured to receive the first sensing signals provided by said current sensor and provide third sensing signals indicative of the level of the current circulating along said one or more secondary windings, said control unit being configured to acquire said input data by processing said third sensing signals.

* * * * *